April 28, 1925.
Re. 16,054
W. E. MOORE
ELECTRIC FURNACE
Original Filed June 11, 1917 6 Sheets-Sheet 1
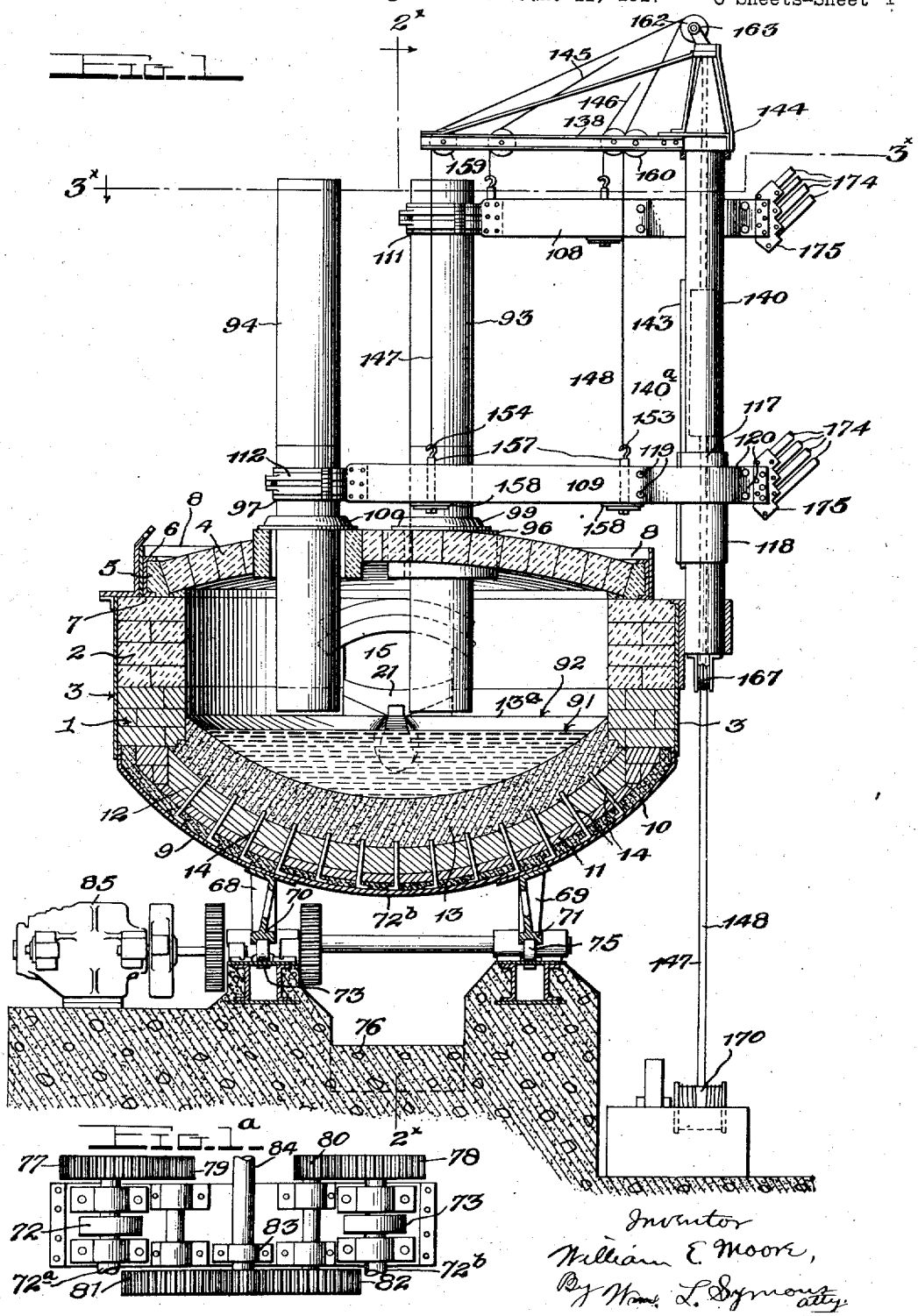

April 28, 1925. Re. 16,054
W. E. MOORE
ELECTRIC FURNACE
Original Filed June 11, 1917 6 Sheets-Sheet 2
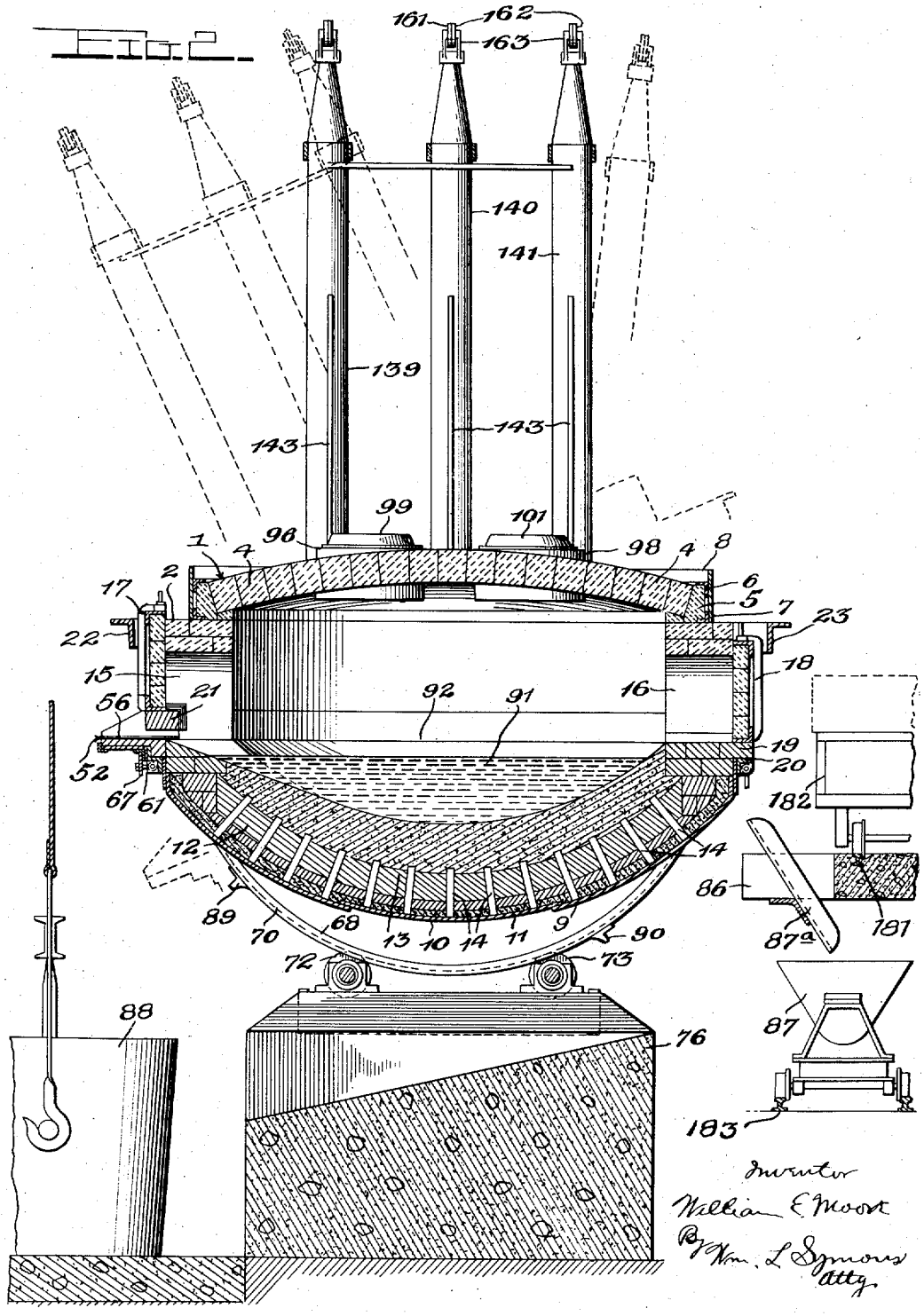
Inventor
William E. Moore
By Wm. L. Symons
Atty.

April 28, 1925. Re. 16,054
W. E. MOORE
ELECTRIC FURNACE
Original Filed June 11, 1917 6 Sheets-Sheet 3
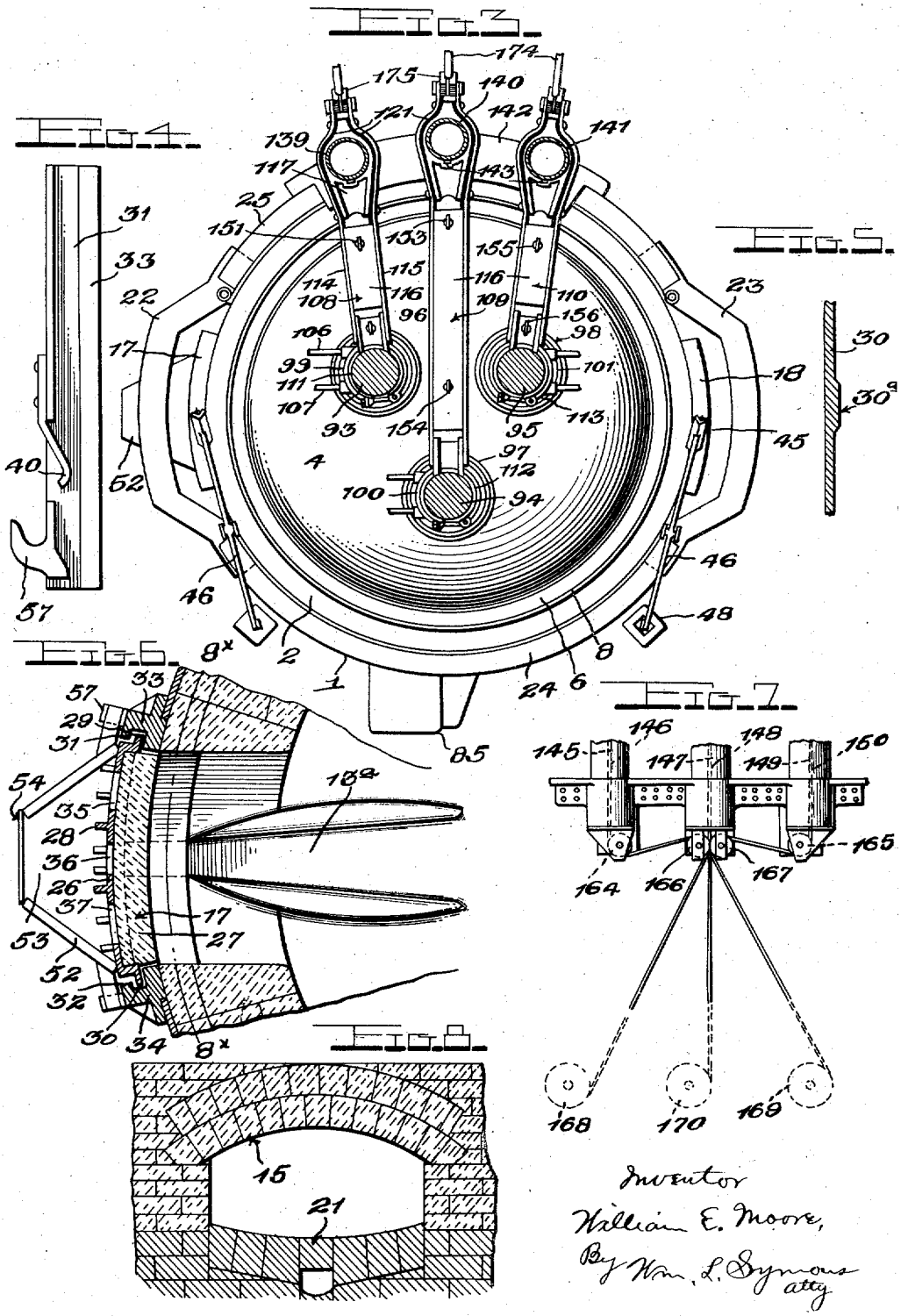
Inventor
William E. Moore,
By Wm. L. Symons
Atty April 28, 1925. Re. 16,054

W. E. MOORE

ELECTRIC FURNACE

Original Filed June 11, 1917 6 Sheets-Sheet 4

Inventor
William E. Moore
By Wm. L. Symons
Atty

April 28, 1925. Re. 16,054

W. E. MOORE

ELECTRIC FURNACE

Original Filed June 11, 1917 6 Sheets-Sheet 5

Inventor
William E. Moore,
By Wm. L. Symons
Atty

April 28, 1925. Re. 16,054

W. E. MOORE

ELECTRIC FURNACE

Original Filed June 11, 1917 6 Sheets-Sheet 6

Inventor
William E. Moore
By Wm. L. Symons
Atty.

Reissued Apr. 28, 1925. Re. 16,054

UNITED STATES PATENT OFFICE.

WILLIAM E. MOORE, OF BEAVER FALLS, PENNSYLVANIA, ASSIGNOR TO PITTSBURGH RESEARCH CORPORATION, A CORPORATION OF DELAWARE.

ELECTRIC FURNACE.

Original No. 1,304,350, dated May 20, 1919, Serial No. 174,010, filed June 11, 1917. Application for reissue filed September 13, 1921. Serial No. 500,431.

*To all whom it may concern:*

Be it known that I, WILLIAM E. MOORE, a citizen of the United States of America, residing at Beaver Falls, in the county of Beaver and State of Pennsylvania, have invented certain new and useful Improvements in Electric Furnaces, of which the following is a specification.

The primary object of this invention is to improve the construction and general efficiency of arc-type electric metallurgical furnaces.

In electric furnaces heretofore manufactured, the furnace shell has been made with a flat bottom or with such a cylindrical bottom that, when the bottom heats, by reason of a portion of the lining floating up, the bottom plate generally buckles up, causing still further breaking of the refractory, and the refractories not being arched in are, if thus loosened, easily floated up by the metal. These disadvantages I overcome by means of a spherical bottom so arranged that the spot heated bulges out and away from the refractories, thus preventing them from being cracked. The refractory brick layers next to the bottom form an inverted arch so that, if they should be loosened and the metal find its way underneath the refractories by reason of the inverted spherical arch, they are better able to resist such floating tendency.

Heretofore it has been customary to mount rolling furnaces on rockers attached to the furnace bottom and rocking on parallel horizontal tracks, the furnace being rocked by means of a screw underneath the bottom of the furnace on the side opposite to the spout or by means of connecting rods coupled to the furnace bottom in the same position and leading down to the crank shaft located underneath the furnace. The movement of the spout in a horizontal direction when the furnace is being rocked makes it difficult to direct the metal stream into the ladle or mold and the location of the tilting gear underneath the furnace opposite the spout practically prohibits the installation of a slag buggy or track running underneath the charging platform which is the natural position. Therefore, the arrangement which I have adopted of mounting the furnace so that its rockers rest on stationary traction rollers with the gears and tilting motor to one side of the furnace, where they do not interfere either with the pouring of the metal or the slagging operation is better. The screw tilting mechanism involves the necessity for some device preventing its overtravel which renders the furnace unsafe. With my furnace, this is readily attained by means of the bumper blocks mounted on the rockers which ride up on the traction rollers at the limits of travel so that the rollers cannot further tilt the furnace, even if they continued to revolve, thus making a cheap and convenient safety device.

It is true that metallurgical furnaces have heretofore been mounted to tilt on stationary rollers so as to eliminate the objectionable spout travel of the rock-over type, but in such cases auxiliary devices have been added to tilt the furnace which are more complicated than the tilting of the furnace by means of traction rollers motor operated.

It has been customary to mount the electrode arms on the back side or side of the furnace opposite the spout with the arms fixed, that is, not rotatable in a horizontal plane. This makes it necessary, when adding new electrodes, or when unclamping electrodes to lower them as they burn away, for the attendant to work on top of and over the hot furnace roof, which is an unhealthy and dangerous operation. These fixed electrode arms also greatly interfere with the operation of changing the roof, which from time to time must be replaced by a new roof arch previously bricked into its roof arch ring. This roof ring is usually handled by means of an overhead crane, an operation greatly interfered with by reason of the fixed electrode arms and holders. Whereas, with my furnace, these parts being rotatable in a horizontal plane may be swung to one side after the electrodes are lifted so as to clear the furnace roof, and also where the electrodes may be conveniently worked at by the attendant when standing upon a suitable platform or step-ladder.

I am aware that furnaces with conducting bottoms have been manufactured, but such bottoms have frequently involved the complications of large water-cooled electrodes or have had electrodes of such size as to interfere with the laying of the brick layers in the bottom of the furnace or, if metal projections from the bottom of the furnace up into the refractories have been eliminated by the use of graphite mixed into the mortar, it frequently happens that, when the furnace is cold, the bottom is of such high resistance that practically no current may be forced through, making necessary the expedient of driving spikes through the refractories to the metal bottom to get a contact. In my furnace, I connect a number of thin metal strips which project through the joints in the bottom brick up into the refractory material of the furnace bottom, said strips being preferably welded to the furnace bottom plate.

Heretofore the electrode winch motors have been mounted immediately adjacent the furnace shell which they rock over with and where they are subject to heat, fumes and dirt, all detrimental elements to the life of the motor, or have been located to one side and connected by means of overhead cables so that the height of the electrodes is greatly disarranged and interfered with at the time of tilting the furnace. This I overcome by combining the cables on pulleys so arranged that the electrodes are held in substantially the same position with reference to the furnace when the latter is tilted, as when it is upright. In other words, my improved arrangement is such that the cables are of substantially the same effective length in the tilted position of the furnace as in its upright position. Specifically, I accomplish this by bringing the cables to a point near the tilting center of the furnace, and leading them from this point to the motor winches carried on a fixed support. Preferably these motor winches are located in a suitable chamber underneath the platform where they are protected from objectionable elements.

In many electric furnaces, the electrode holders have been made of one piece with a split joint, the joint being drawn together or bent apart by means of a screw or screws. Owing to the irregularities of the electrode sizes, such construction throws a severe strain upon the electrode holder, bending it and causing severe work on the part of the attendant to open up or close the clamp. It also prevents the proper contact of the clamp with the carbon. According to my invention, the electrode clamp is easily loosened and the loose sides thereof compensate for the variable dimensions of electrodes which may be inserted through the front of clamp avoiding the necessity of threading down through the top which at the same time greatly reduces and quickens the work of the attendant.

In electric furnaces heretofore generally made, it is impractical to use the skimmer arch for the reason that the slag must be drawn out through the pouring door or spout of the furnace. My furnace permits the use of the skimmer arch and greatly helps to hold back the slag from mixing with the metal in the ladle when "pouring" the furnace.

In furnaces heretofore made, the door maintenance has been extremely high due to the fact that the heat rays leaking through the cracks between the abutting points of the door frame and the furnace shell cause severe heating and burning of same, and also great heat losses. My construction, which permits the lapping of refractories of the door with the furnace lining, avoids these difficulties and preserves the metal work and retains the furnace heat.

There has also been great difficulty in holding the door against the furnace shell due to the expansion and warping of the door frame and of the door castings. In my furnace, adjustable means or strips for holding the door against the furnace shell only at the lower portion of its stroke eliminate these difficulties.

In electric furnaces, it has heretofore been customary to have a metal arm which is grounded or in contact with the furnace shell extending out from the electrode clamp which is suspended from same by means of suitable insulation bolts and washers; this insulation being immediately over the electrode opening in the roof is subject to intense heat, smoke and gases. In my structure, I mount the electrode holders on the ends of rigid conducting arms carried on suitable sliding sleeves which move upon the columns which are grounded and in contact with the furnace frame-work; the arm being insulated from the slides by means of insulation which, being located to one side of the furnace roof, is less exposed to heat, smoke and gases.

Heretofore, it has been customary to rivet or bolt the furnace pouring spout to the shell. As the refractory lining of the spout is rapidly worn or washed away by the intensely hot metal, the spouts must frequently be changed or relined, which in the old furnace was slow work, and if relined while on the hot furnace made poor linings of short life. I have overcome these difficulties by means of duplicate spouts quickly interchangeable by hooking on the furnace shell.

Heretofore the door frames and door castings have been subjected to excessive heating. This I have overcome largely by means of ribs for radiating the heat from those parts of the door which are subjected to the greatest heat effects.

Other objects and advantages of my invention will appear from the following description, the novel features being more particularly pointed out in the accompanying claims.

In order to more fully describe my invention, reference will be had to the accompanying drawings in which:—

Figure 1 is a vertical central sectional view, partly in elevation, of one embodiment of my improved furnace;

Fig. 1ª is a detail top plan view of the driving gearing of the traction rollers for tilting the furnace;

Fig. 2 is a section of said furnace taken on the line 2ˣ—2ˣ of Fig. 1;

Fig. 3 is a section on the line 3ˣ—3ˣ of Fig. 1;

Fig. 4 is a detail side elevation of one of the door frames;

Fig. 5 is a detail section of a portion of one of the door frames;

Fig. 6 is a fragmentary horizontal detail section through the pouring opening and parts adjacent thereto;

Fig. 7 is a semi-diagrammatic fragmentary elevation to show the disposition of the electrode hoisting cables leading from the cranes to the hoisting drums;

Fig. 8 is a detail section on the line 8ˣ—8ˣ of Fig. 6;

Figure 9:
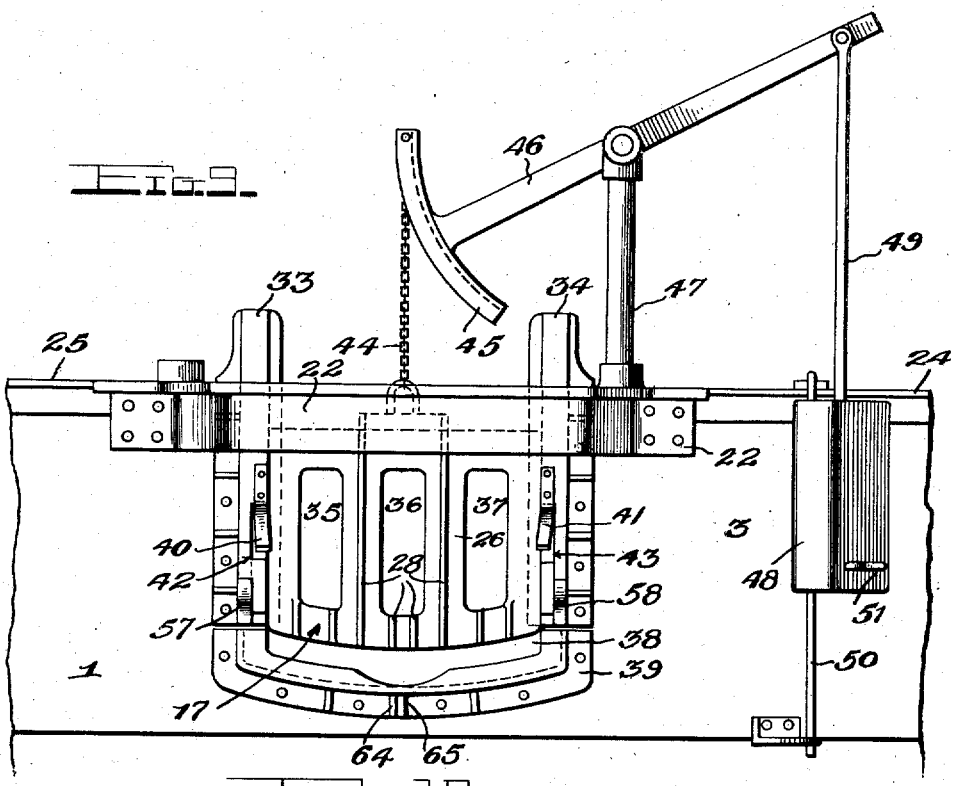
Figs. 9 and 10 are detail views in elevation of one of the furnace doors and parts immediately associated therewith.
Figure 10:
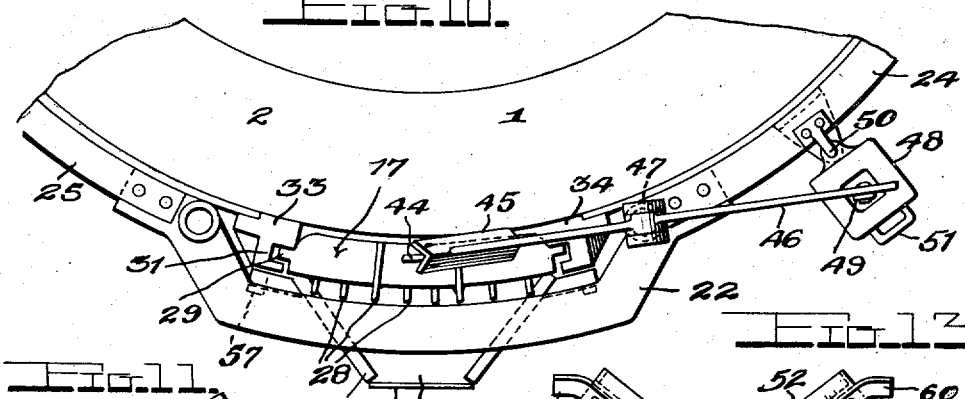
Figure 11:
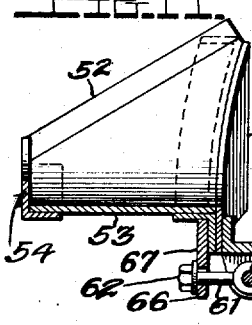
Figure 12:
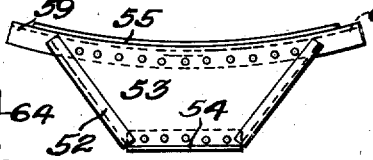
Figure 13:
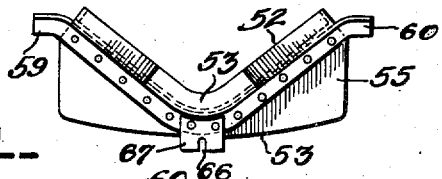
Figure 14:
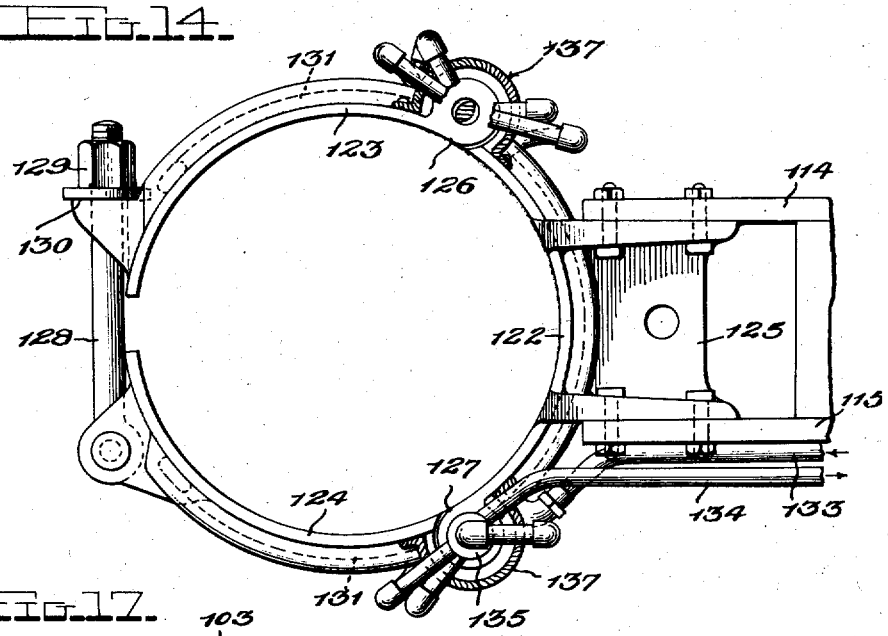
Figure 17:
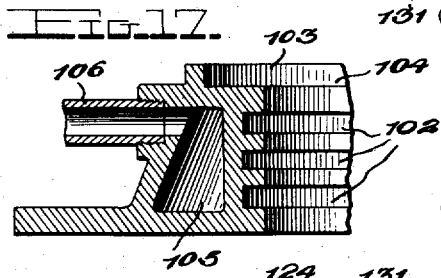
Figure 15:
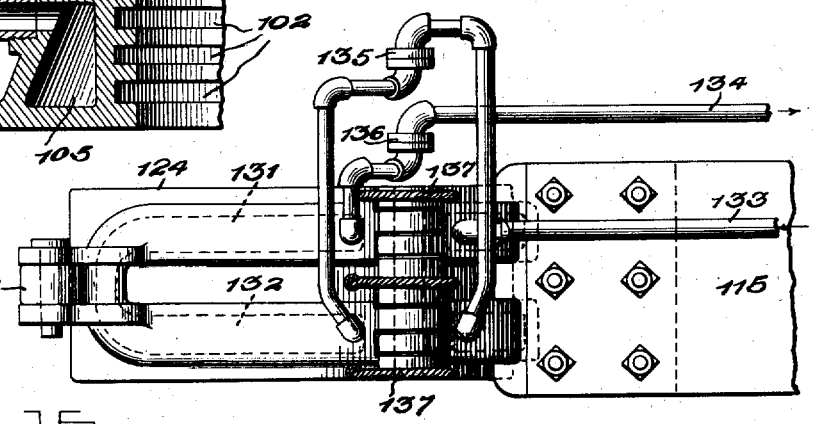
Figure 16:
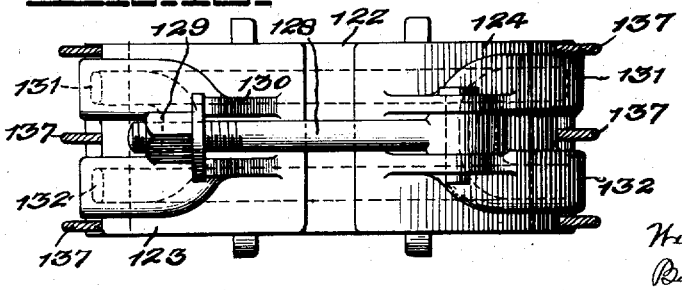
Figure 18:
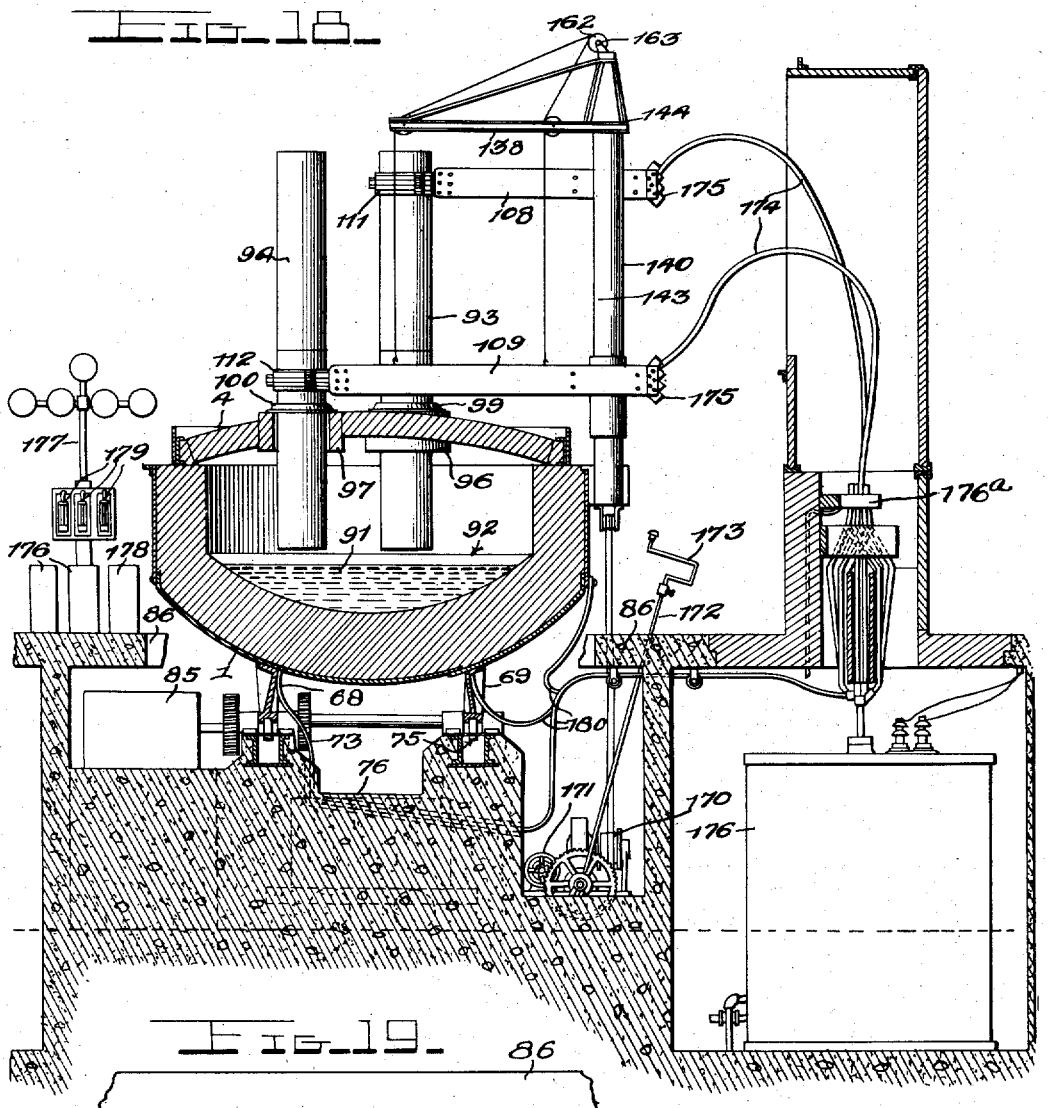
Figure 19:
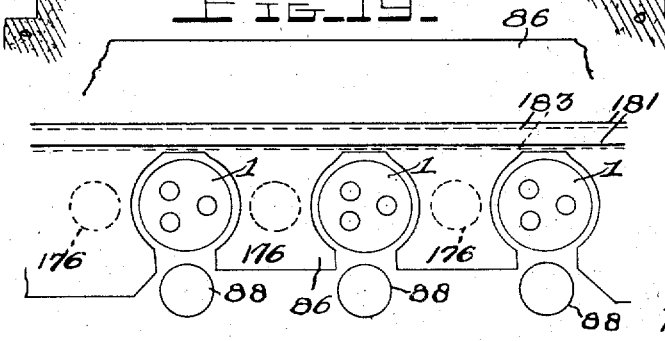

Figs. 11 to 13, inclusive, are details of the spout;

Figs. 14 to 16, inclusive, are details of one of the electrode holders;

Fig. 17 is a fragmentary detail vertical section of one of the electrode glands;

Fig. 18 is a vertical sectional elevation showing the general arrangement of a furnace unit of a plant according to my invention; and Fig. 19 is a diagram showing the relative arrangement in top plan of several furnaces in a row to the charging and slagging tracks, transformers and ladles.

The furnace proper here shown consists, among other parts, of a cylindrical shell and lining usually of basic brick 1 and acid brick 2, inclosed in a metal casing 3 and an arched roof 4 of acid brick or other refractory material, supported by an acid brick skewback ring 5 held within two rings 6 and 7 of angle iron, which in turn engage the inner periphery of a metal ring 8.

The furnace bottom is composed, among other parts, of an outer metal casing 9, the upper edges of which are overlapped and engaged by the cylindrical casing 3; a lining 10 next to the casing 9 consisting of conducting mortar composed of graphite or carbon mixed with molasses, or pitch, or other suitable material; a layer of basic or neutral brick 11 next to said lining; a layer or strata of refractory material 12 which is electrically conducting at ordinary temperatures, and a top layer 13 of refractory material which becomes electrically conducting only at high temperature. The layer 13 is provided with a pouring depression 13ª leading to the pouring opening, as shown most clearly in Fig. 6. This layer (13) of the furnace bottom may consist of magnesite, dolomite, chromite, ganister or other refractory material which becomes electrically conducting at high temperatures. The layer 12 may be composed of carbon, graphite, or other suitable conducting material, and the mixture is so constituted that the strata or layer 12 is of increasing conductivity downward; that is to say, when cold it is a better electrical conductor at its bottom than at its top. The bricks 11 are laid with conducting mortar which may be of the same material as the lining 10. A multiplicity of metal strips or fins 14 are welded or otherwise attached to the metal plates 9 and extend upward between bricks 11, through layer 12 and into the layer 13. The inverted arch of one or more layers of magnesite brick laid in between conducting strips 14 resists the floating up of the bottom in case the granular refractories overlying the same break up or give way.

Maximum strength of the furnace bottom and freedom of the same to expand are secured by making said bottom in the form of a section of a sphere, or spherical shaped. With this construction, when hot spots occur, the expansion is always outward and away from the refractories, tending to prevent bulging or breaking of the latter.

Located 180° apart and extending through the cylindrical side walls of the furnace retort are two openings 15 and 16, the former constituting the charging opening and the latter the pouring opening. These openings are provided, respectively, with refractory lined vertically sliding doors 17 and 18, the latter in its lowermost position resting upon a refractory ledge or fore-plate 19 outside of the charging opening and supported upon an agle iron sill or fore-plate 20. The door of the pouring opening in its lowermost position may rest upon a slag skimmer arch or dam 21 of refractory material extending across the pouring opening. The doors 17 and 18 slide vertically through fixed yokes or lintels 22 and 23, respectively, fast to the furnace shell and to angle iron sectors or straps 24 and 25 around the outer and upper portions of the cylindrical shell of the furnace (see Fig. 3). These yokes and straps form a retaining band for the furnace shell across the door openings where the furnace shell is cut away. The furnace shell is not only cut away to the width of the door openings through the refractories thereof, but cut wider to allow the refractory door linings to lap the refractory lining of the shell, and also cut away above the door openings so that the white hot refractory door linings will not bulge and burn the furnace shell when the doors are raised; this arrangement allowing the refractory door linings to project beyond the face of the door castings so as to close directly against the arches over the doors and the furnace lining at the sides of the doors.

The doors 17 and 18 are identical in construction, and the detail description of one will suffice for both. The door of the pouring opening (see Figs. 4, 5, 6, 9 and 10) comprises, among other parts, casting 26 having an insert or refractory lining 27, a plurality of vertical exterior ribs 28, and side flanges 29 and 30 adapted to travel in grooves or ways 31 and 32 in two vertical guides 33 and 34 fast to the outside of the furnace. The ribs 28 on these doors facilitate cooling, and are placed at points thereon which require the greatest cooling. For lightness, the door frame is provided with three openings 35, 36 and 37. These doors are arched in horizontal cross section so as to fit against the cylindrical portion of the furnace shell, and better retain their refractory linings, and also have an inverted arched bottom adapted to conform to the spout-shaped arc of the refractory insert or lining 38 in the foreplate or door sill casting 39 fast to the outside of the furnace shell.

For the purpose of jamming the door against the rear walls of the guides 33 and 34 to hold the same tightly closed, there are provided two resilient metal strips 40 and 41 fast, respectively, to the guides 33 and 34 and bent to extend through cut-away portions 42 and 43 of said guides into the ways in which the door travels. These jamming strips may be adjusted to take care of the varying expansions in the door and furnace shell. Each side flange 29 and 30 of the door frame is provided with a raised portion 30[a] adapted to be engaged by the respective members 40 and 41.

For the purpose of raising and lowering the furnace doors, the following is provided for each door: The door is attached at its top to the lower end of a chain 44, the other end of which is attached to a sector 45 formed on one end of a lever 46 fulcrumed upon the upper end of a supporting collar 47 rigidly mounted upon the yoke or lintel 22 of the furnace shell. The furnace door is counterbalanced by a weight 48 attached to the lever 46 through an arm 49, said weight being guided in its vertical movement by a stationary rod 50. This weight is preferably made hollow so that additional weights may be inserted therein to be removed as the refractory lining of the door burns away so as to compensate for decreasing weight of the door. The counterweight 48 may be provided with a handle 51 for raising and lowering the same.

The furnace is provided with a detachable spout 52 interchangeable with either the pouring or charging openings, thereby rendering the furnace reversible. This spout comprises, among other parts (see particularly Figs. 10 to 13, inclusive), a metal frame or casting having a trough-shaped bottom 53, an upwardly extending forward flange 54, and a rear flange or apron 55 arched to fit the cylindrical contour of the furnace shell. This spout is lined with suitable refractory material 56 (see Fig. 2), and is supported upon the furnace by two hooks 57 and 58 fast to each door frame, and in which rest extensions 59 and 60 of the spout casing. The spout is held in position against the furnace by a bolt 61 and nut 62, the bolt being mounted to swing on a rod 63 carried by two flanges 64 and 65 on the frame of each door sill, said bolt being adapted to extend through a slot 66 (see Figs. 11 and 13) formed in a plate 67 fast to the spout casing.

For supporting the furnace for tilting motion, and for operating it to effect this motion, the following mechanism is provided:—

Rigidly fastened to the metal casing of the bottom are two rockers 68 and 69 having runways or longitudinally grooved tread portions 70 and 71. The grooved treads of these rockers rest, respectively, upon pairs of traction rollers 72—73 and 74—75. The roller 74 does not appear in the drawings but is located opposite the roller 72. These rollers are supported upon shafts journaled in suitable bearings mounted on the masonry foundation 76, as shown.

The furnace is tilted by imparting rotation to the rollers 72—73 and 74—75, and this is effected in the case shown (see Figs. 1 and 1[a]), by mounting fast on the shafts 72[a] and 72[b] of these rollers, to which shafts said rollers are also fast, gears 77 and 78 meshing with pinions 79 and 80 driven by gears 81 and 82 which mesh with an intermediate pinion 83 on a power shaft 84 connecting to the armature shaft of an electric motor 85. This motor is located at one side of the furnace and underneath the charging platform 86 (see Fig. 18), where it is out of the way during the charging and slagging operations, thus permitting a slag car 87 to run beneath the rear doors 18 of a line of furnaces for catching the slag for which there is preferably provided a chute 87[a]. The tilting motor is also out of the way of ladle 88 when set under the pouring opening. The travel of the furnace in tilting is limited in both directions by stops 89 and 90 fast to the rockers 70 and 71, and adapted to engage with the traction rollers.

In the accompanying drawings, 91 indicates the molten metal. The layer of slag, however, which would naturally always extend over this molten metal, is omitted for the sake of greater clearness in showing the construction of the retort proper. It will be understood, however, that the line 92 (Fig. 2) indicates the approximate slag level.

The present furnace is provided with three arcing electrodes 93, 94 and 95 supported as hereinafter described and arranged with their vertical axes 120° apart. These electrodes extend into the furnace through three collars or rings 96, 97 and 98, respectively, of refractory material fitted into or forming a part of the furnace roof. These electrodes also pass, respectively, through three water cooled glands 99, 100 and 101 resting upon the refractory rings 96, 97 and 98.

These glands are similar in construction so that the description of one will suffice for all. One of these glands is shown in detail in Fig. 17, from which it will be seen that the wall adjacent the electrode passage is provided with a series of annular grooves 102 which restrict the circulation of gas and promote the deposit of soot to make a better fit around the electrode. There is also formed on the top of the gland an arm or flange 103 which forms a recess or cavity 104 on top of the gland, which cavity may be filled with asbestos or other suitable material to form a seal around the electrode. The casting of this gland is cored to form an annular water circulating chamber 105 arranged for connection with inlet and outlet pipes 106 and 107 disposed tangential to the water circulation chamber as shown most clearly in Fig. 3. The water pipes enter at the top of the jacket annulus so that the entering velocity of the water induces the circulation around the jacket annulus and the exit pipe being at the top of the annulus sweeps out completely any accumulation of steam or gases such as might nullify the cooling effect.

Each electrode is individually supported by a clamp or holder carried on the end of an arm mounted for vertical as well as horizontal movement, so that the electrodes may be raised and lowered or swung in a horizontal plane. In the accompanying drawings, 108, 109 and 110 represent the three electrode arms, and 111, 112 and 113 the electrode clamps carried respectively by these three arms. Each of these electrode arms is in the form of a rectangular tube or box composed of flat side members 114 and 115 and top and bottom members 116 inserted between and attached to the side members to form rectangular tubes or boxing mechanically stiff against torsion or bending stresses, and the whole made of electrical conducting material. The side members 114 and 115 extend forwardly and rearwardly of the top and bottom members of the box to form straps between which are held, respectively, the electrode clamp at one end of the arm and a supporting slide or casting 117 at the other end of the arm, said block having a sleeve 118 adapted to make a sliding fit with one of three vertical columns and constituting a part of the electrode crane hereinafter more particularly described. The side members 114 and 115 of each electrode arm are rigidly attached to the slide 117 by bolts 119 and 120 thoroughly insulated from the conducting material of the electrode arm. The electrode arm is also insulated from its supporting block 117 by insulating material 121. In this way, the conducting material of the electrode arms is thoroughly insulated from its crane column and from the shell of the furnace proper. The electrical conducting sides of said electrode arms pass around opposite sides of the sliding sleeve and its inclosed steel hollow column so as to neutralize the inductive effects of the heavy alternating current.

One of the electrode clamps is shown in detail in Figs. 14 to 16, inclusive. Each of these clamps comprises three metal electrode engaging sections, a fixed section 122 and two hinged sections 123 and 124. The fixed section 122 has an extension 125 bolted rigidly between the side members 114 and 115 of the electrode arm so as to make a good electrical connection therewith. The two sections 123 and 124 are adapted to swing on hinges 126 and 127 and are clamped around the electrode by a bolt 128 pivotally attached to a section 124 and carrying a nut 129 adapted to be screwed against a slotted lug 130 on the section 123. The pins on hinges 126—127 are of copper, slightly oval in section, being formed by turning on two different centers so that, while the contact surfaces of said pins form accurate contact with the bore of hinges, the pins are, nevertheless, loose in the hinges and free when unclamped to open without galling or binding in the bores of the hinge leads. Each electrode clamp is double water jacketed, for which purpose each clamping member is provided with two water circulating chambers 131 and 132 connected to inlet and outlet pipes 133 and 134 and provided with piping bridging the hinged joints and having swiveled unions 135 and 136.

For the purpose of forming a more perfect electrical connection between hinged sections 123 and 124 and fixed section 122, the former are electrically connected to the latter through flexible braided cables or bonds 137 brazed or otherwise connected to the clamp sections around and shunting the hinged joints, as shown. In the accompanying drawings, I have indicated but three such bonds for each hinge, it being understood, however, that in actual practice a greater number may be employed if desired. In Figs. 3 and 18 of the drawings, the water piping and other details of the electrode clamps are omitted for the sake of clearness.

Each electrode arm is preferably supported on an individual crane, each of which cranes comprises a vertical column upon the upper end of which is carried a horizontally movable or swinging hoisting mechanism, hereinafter described. In the accompanying drawings, 139, 140 and 141 represent the three crane columns, each of which extends at its lower end into an individual opening in a supporting bracket 142 fast to the exterior of the furnace shell.

As hereinbefore stated, the sleeves 118 of the respective electrode arms make a sliding fit with their respective crane columns. Throughout a greater portion of the vertical movement of the electrode arms, they are held against angular movement horizontally and may be only so moved when they have been raised approximately to the upper limit of their travel. This is effected by means of a feather 143 on the crane column engaging with a slot in the collar 118 of that column.

Each crane jib 138 is fixed at one end to a swivel cap 144 rotatable on the upper end of its supporting column. The three electrode arms 108, 109 and 110 are supported, respectively, by pairs of cables 145—146, 147—148 and 149—150 connected at their lower ends, respectively, to pairs of hooks 151—152, 153—154 and 155—156 attached to the three electrode arms and insulated therefrom by tubes 157 and washers 158 of insulating material. Each crane jib carries two pulleys 159 and 160, over which the individual supporting chains or cables of the respective jibs pass to two pulleys 161 and 162 mounted in a bracket 163 on the top of the swivel cap (see Fig. 2), thence into the hollow column of that crane. The cables passing through the outer columns 139 and 141 pass at the lower ends of said columns over pulleys 164 and 165 (see Fig. 7) and thence over pulleys 166 and 167 at the lower end of the center column, and thence to winding drums 168 and 169. The cables of the center column pass straight down between the pulleys 166 and 167 to a winding drum 170. The point between pulleys 166 and 167 to which the cables converge from the winding drums (see Fig. 7) approximately coincides with the tilting axis of the furnace, so that the tilting of the furnace will not largely affect the height of the electrodes; that is, will not raise or lower them by acting on the hoisting cables to an objectionable extent.

Within each of the hollow columns 139, 140 and 141 is a counterweight 140ᵃ attached to the hoisting cables extending through the respective columns and adapted to travel vertically therein. Each of these weights is of sufficient mass to counterbalance its corresponding electrode arm without the electrode secured thereto so that, when an electrode is detached from its arm, the latter will be counterbalanced.

The hoisting drums 168, 169 and 170 are equipped with means for operating them either by electric or other power or manually, the latter being used when the electric power is off or when it is desired to raise or lower the electrodes a small amount only as in adjusting the arcs. In Fig. 6, 171 indicates the electric motor for this purpose, and 172 the shaft having a detachable hand operated crank arm 173 applicable at its upper end and connected at its other end through suitable gearing to the power shaft of the hoisting drums for operating the same manually.

The current is led to the electrode arms by a plurality of heavy flexible cables 174, and these are connected to their respective electrode arms by cable clamps 175 consisting each of a pair of plates (see Fig. 3) bolted between and in good electrical contact with extensions of the side conducting members of the respective electrode arms. The pairs of plates composing these cable clamps are provided on their interior faces with matched grooves adapted to receive the cables and extending diagonally of the horizontal axis of the electrode arms so that the cables will pass to said arms on a slant or at an angle, as shown in Figs. 1 and 18. These cable clamps avoid soldering or brazing of the cables where they connect to the electrode arms, at which points they are subject to breakage by constant bending. With the cable clamps shown, all that is necessary when a cable becomes broken or frayed at this point is to loosen the clamp, slide the cable in it, and tighten the clamp again.

The cable connections from the furnace to the transformers and the general layout of the plant are shown in Fig. 18. From this view, it will be seen that the transformers 176 (only one of which is shown) are located in a pit to one side of the furnace and preferably beneath the charging platform 86, the cables 174 being brought up therefrom to a clamp 176ᵃ substantialy in line with the tilting axis of the furnace and connected to the electrode arms so as to permit proper sliding and horizontal rotat on of the electrode arms and, at the same time, allowing of a maximum flexibility for forward and backward tilting movements of the furnace. It will also be seen that the hoisting motors 171 and their drums and gearing are located in a pit below the charging platform so as to be entirely out of the way of the heat and dust. The motor 85 for tilting the furnace, as hereinbefore pointed out, is also located in such position as to in no way interfere with the charging, slagging, or other operations.

The instrument "tree" 177, with motor controllers 178 and switches 179 are placed on the charging platform to one side of the furnace in a position for the operator to conveniently observe the pouring spout. In the furnace here shown, an electric connection is effected from the furnace bottom to a terminal or terminals in the transformer system through cables 180. In connection with Fig. 18, it might here be stated that the furnace shell and top there illustrated is shown of seamless or continuous material. This, however, is done merely for the purpose of simplicity in the drawings, as this view is not directed to the construction of details of the furnace retort, it being understood that the construction of the retort in this case is the same as in other views. It might also be stated that the electrodes here shown are built up of longitudinal sections joined together according to common practice.

In Fig. 19, I have shown in top plan diagrammatically, the layout of several furnaces in a row, showing the charging track 181 extending along the rear of and common to the series of furnaces and on which travels the charging car 182. Parallel with this track and beneath it is the track 183 of the slagging car 87. The transformers 176 are located between the furnaces, as shown. The whole arrangement is such as to effect the greatest economy in space and facility of operation.

While I have herein shown and described one specific embodiment of my invention, it should be understood that various modifications thereof may be made without departing from the spirit of the invention.

Having thus described the invention, what is claimed as new is:—

1. A metallurgical furnace having means to heat the same electrically and comprising a retort, rockers on which said retort is mounted, traction rollers supporting said rockers and carrying the entire weight of the furnace, and means to drive said rollers to tilt said furnace.

2. The combination with a charging platform, of a metallurgical furnace having means to heat the same electrically, means to tiltingly mount said furnace below said platform, a motor connected to tilt said furnace and located below said platform and to one side of the furnace, and means extending above the platform for controlling the motor.

3. A metallurgical furnace having means to heat the same electrically and comprising a retort having a shell provided with a spherically shaped bottom, and an inverted arch-shaped refractory lining.

4. A metallurgical furnace having means to heat the same electrically and comprising a retort having a shell provided with a spherical bottom, and an inverted arch-shaped refractory lining made up of a plurality of layers.

5. A metallurgical furnace comprising a retort having a spherically shaped bottom composed of a plurality of layers of refractory material, and electrically conducting strips extending through one or more of said layers.

6. A metallurgical furnace comprising a retort having a bottom composed of a layer of granular refractory material normally of low electrical conductivity but which becomes a better electric conductor when heated, a layer of granular or amorphous refractory material of normally higher electrical conductivity than the first-mentioned layer and beneath the same, a metal outer casing, a layer of granular electrical conducting material forming a lining for said casing, an inverted arch of refractory brick interposed between the second-mentioned layer and said lining of the outer casing, and a plurality of metal strips in electrical contact with said casing and extending through the spaces between said brick, through the layer next above said brick and into the first-mentioned layer.

7. A metallurgical furnace comprising a retort, the bottom of which comprises strata of amorphous or granular material, a layer of brick interposed between said strata, and electrically conducting strips extending from one of said strata of granular material to another of said strata through said layer of brick.

8. A metallurgical furnace comprising a retort, the bottom of which comprises strata of granular material, a layer of refractory material comprising an inverted arch interposed between said strata, and electrically conducting strips extending from one of said strata of granular material to another of said strata through said arch.

9. A metallurgical furnace comprising a retort, the bottom of which comprises strata of amorphous or other granular material, an inverted spherically shaped brick arch interposed between said strata, and electrically conducting anchor plates extending from one of said strata of granular material to another of said strata through said brick arch.

10. A metallurgical furnace comprising a retort, the bottom of which comprises strata of granular material, an inverted spherically shaped brick arch interposed between between said strata, electrically conducting anchor plates extending from one of said strata of granular material to another of said strata through said brick arch, an outer metal casing, said anchor plates secured to said casing and extending through said brick arch and through one of said granular strata into the other.

11. A metallurgical furnace comprising a retort, the bottom of which comprises strata of pyro-conducting material, an inverted spherically shaped brick arch interposed betwen said strata, electrically conducting anchor plates extending from one of said strata of material to another of said strata through said brick arch, an outer metal casing, and anchor strips secured to said casing and extending through said brick arch and through one of said strata into the other.

12. A metallurgical furnace having means to heat the same electrically and comprising a retort having a pouring opening, a skimmer arch extending across said opening, and a tap-hole below said arch.

13. A metallurgical furnace having means to heat the same electrically and comprising a retort having a pouring opening, a skimmer arch extending across said opening, a tap-hole below said arch, and a charging opening opposite said opening.

14. A metallurgical furnace having means to heat the same electrically and having a slidable door comprising an exteriorly ribbed metal frame, and a refractory lining, and means to jam the door against the side of the furnace in closing the door.

15. A metallurgical furnace having means to heat the same electrically and having a sliding door provided with a refractory lining, means to jam the refractory lining of said door against the side of said furnace in closing the door, said jamming means being adjustable to compensate for the burning away of the refractory lining or warping of the door or frame.

16. A metallurgical furnace having means to heat the same electrically and having a sliding door provided with a refractory lining and resilient means engaging the door to force the latter against the side of the furnace when the door is closed, said resilient means acting to compensate for the burning away of the refractory lining or warping of the door or frame.

17. A metallurgical furnace, comprising a retort, a detachable spout therefor, hooks for supporting said spout, and means comprising a swinging bolt to hold said spout in position.

18. A metallurgical furnace, comprising a retort, a spout therefor having a flanged metal frame or casing lined with refractory material and having arms extending to each side thereof, hooks in which said arms are adapted to rest to support the spout, a slotted plate secured to said spout, and a swinging bolt adapted to engage a slot in said plate and provided with a nut adapted to cooperate therewith to retain said spout in position.

19. A metallurgical furnace comprising a retort mounted for tilting movement, a plurality of electrodes, a pivoted supporting arm for each electrode, hoisting cables attached to said electrode arms to impart vertical travel thereto, said hoisting cables being brought into proximity to each other along the pivotal axis of said pivoted arms.

20. An electrical metallurgical furnace comprising a retort having an opening in its roof, an electrode gland mounted on said roof in register with said opening and means carried by the gland for automatically sealing the space between the walls of the gland and the surface of the electrode.

21. An electrical metallurgical furnace comprising a retort having an opening in its roof, an electrode gland mounted on said roof in register with said opening and means carried by the gland on the interior thereof for promoting the deposit of soot between the gland and the electrode thereby insuring a tight fit.

22. A metallurgical furnace comprising an electrode, an electrical conducting arm for supporting said electrode, an electrical conducting electrode clamp carried by said arm, said clamp having a fixed water-jacket section and a pair of movable water-jacketed sections hinged to said fixed section, flexible means for electrically connecting the hinged sections with the fixed section and flexible means for connecting the water-jacket of said fixed and hinged sections in any position of the latter.

23. In a metallurgical furnace, a retort, means for tilting the retort, a support carried by the retort, pivoted arms carried by said support, electrodes carried by the arms, said arms extending at right angles to the tilting plane and means for raising and lowering said arms.

24. In a metallurgical furnace, a retort, means for tilting the retort, a support carried by the retort, pivoted arms carried by said support, electrodes carried by the arms, said arms extending at right angles to the tilting plane, means for raising and lowering said arms said means comprising cables secured by the arms, pulleys secured to the support arranged to receive the cables, the ends of said cables being brought together along the pivotal axis of said arms.

25. A metallurgical furnace comprising a retort mounted for tilting movement, a vertical metal column carried by said retort, an electrode, an electrically conducting arm for supporting said electrode and carrying at one end electrode holding means, a slide to which said arm is secured at its other end, means for insulating said arm from the furnace shell, said slide being adapted to travel on said column, and means to raise and lower said arm, said arm being split where it engages said slide so as to divide the electric current around the column and slide and neutralize the self-induction due to said column and slide.

26. A metallurgical furnace comprising a retort mounted for tilting movement, a vertical column carried by said retort, an electrode, an electrically insulated arm for supporting said electrode and carrying at one end electrode holding means, a collar to which said arm is secured at its other end, means to raise and lower said arm, and means to direct the current to neutralize self-induction.

27. A metallurgical furnace comprising a retort, a column mounted thereon, and constituting a portion of a crane for lifting and supporting an electrode, an electrode arm having a slide adapted to travel on said column, insulated securing means for said arm, cables attached to said securing means, pulleys carried by said crane and over which said cables pass, said securing means, cables and pulleys being so disposed as to support said arm against vertical angular movement which would increase the friction between said slide and column.

28. A metallurgical furnace comprising a retort, a column mounted thereon and constituting a portion of a crane for lifting and supporting an electrode, an electrode arm having a slide adapted to travel on said column, bolt hooks secured to said arm, cables attached to said hooks, a swinging arm carried by said column, and pulleys carried by said arm and over which said cables pass, said hooks, cables and pulleys being so disposed as to support said arm against vertical angular movement which would increase the friction between said slide and column and to permit said arm to rotate in a horizontal plane.

29. A metallurgical furnace comprising a retort mounted for tilting movement, a vertical column carried by said retort, an electrode, an electrically conducting arm for supporting said electrode and carrying at one end electrode holding means, a collar to which said arm is secured at its other end, means to raise and lower said arm, means for supporting said arm whereby it may swing in a plane transverse to the longitudinal axis of said column, and hoisting means to support said electrode arm and insulate the same from the furnace shell.

30. A metallurgical furnace comprising a retort mounted for tilting movement, a vertical column carried by said retort, an electrode, an electrically conducting arm for supporting said electrode and carrying at one end electrode holding means, a collar to which said arm is secured at its other end, means to raise and lower said arm, a crane jib carried by said column and adapted to swing in a plane transverse to the longitudinal axis of said column, hoisting means to support said electrode arm from the crane comprising said jib and column, said electrode arm being rotatable around the axis of said column, and means to hold said arm normally against such rotation.

31. A metallurgical furnace comprising a retort mounted for tilting movement, a plurality of electrodes, a supporting arm for each electrode, hoisting cables attached to said electrode arms to impart vertical travel thereto and brought into proximity to each other at a point substantially coinciding with the pivotal axis of said retort, and hoisting means for operating said cables.

32. A metallurgical furnace comprising a retort mounted for tilting movement, an electrode, an electrically conducting hollow arm of rectangular cross-section for supporting said electrode, and a cable holder comprising a pair of cable clamping plates attached to said arm.

33. A metallurgical furnace comprising a retort mounted for tilting movement, an electrode, an electrically conducting arm for supporting said electrode, and a cable holder comprising a pair of cable clamping plates attached to said arm and having grooves diagonal to the longitudinal direction of said arm and adapted to engage individual cables.

34. An electrical metallurgical furnace comprising an electrode, and electrically conducting arm for supporting said electrode, an electrically conducting electrode clamp carried by said arm and having one or more hinged sections, and flexible electrical connections around said hinge connections.

35. In an electric metallurgical furnace, an electrode clamp comprising fixed and movable water jacketed sections hinged together, and flexible pipe connections leading from the water jacket of one section to that of another.

36. In an electric metallurgical furnace, an electrode clamp comprising fixed and movable water jacketed sections hinged together, and pipe connections leading from the water jacket of one section to that of another, said pipe connections including swivel unions.

37. In an electric metallurgical furnace, an electrode clamp comprising a fixed electrode clamping member, and one or more movable clamping members hinged to said fixed member.

38. In an electric metallurgical furnace, an electrode clamp comprising one or more hinged sections, said hinge including an electrically conducting hinge pin of oval cross-section.

39. In an electric metallurgical furnace, an electrode clamp comprising a fixed electrode clamping member, and two movable clamping members hinged to said fixed member, and a swinging bolt forming a connection between said movable members to bind the same against the electrode.

40. An electric metallurgical furnace comprising a retort having an opening in its roof, an electrode gland mounted on said roof in register with said opening and having a plurality of interior annular grooves or recesses arranged to lie adjacent the electrode.

41. An electric metallurgical furnace comprising a retort having an opening in its roof, an electrode gland mounted on said roof in register with said opening, and having an annular water jacket, and inlet and outlet openings therefor arranged to direct the flow of water substantially tangential to the annular water jacket.

42. The combination with a metallurgical furnace of a charging platform therefor, and electrode hoisting means comprising a motor winch located beneath said platform and to one side of said furnace approximately 90° from the spout thereof.

43. The combination with a tilting electric metallurgical furnace, of an electrode supporting arm carried on said furnace and having electric cable attaching means, a transformer located to one side of said furnace substantially in alinement with the vertical plane of the tilting axis thereof, and cable holding means above said transformer from which the cables are carried to said cable attaching means of the electrode arm.

44. The combination with an electric metallurgical furnace, of a charging platform therefor, electrode hoisting mechanism comprising a cable drum located beneath said platform, and manual means to operate said drum from said platform comprising a shaft geared to said drum and extending to a point above said platform and provided with means for operating the same.

45. The combination with a plurality of electrically heated metallurgical furnaces arranged in a row, and each having door openings at its opposite sides in line with an axis extending transversely to the line of furnaces, a charging platform, and a track thereon common to the several furnaces, a charging car adapted to travel on said track to deliver material to any of said furnaces, a track below the said platform and common to said series of furnaces, and a slagging car adapted to travel on the last-mentioned track.

46. A metallurgical furnace having electrical heating means and comprising a retort, rockers on which said retort is mounted, traction rollers supporting said rockers, and means carried by said rockers to limit the rocking motion thereof on said rollers.

47. A metallurgical furnace having electrical heating means and comprising a retort mounted for tilting movement and having charging and casting openings located on opposite sides of its tilting axis, means to limit the tilting movement of said retort, and power means for imparting tilting movement to said retort and located to one side thereof in a plane intermediate of said openings.

48. A metallurgical furnace having electrical heating means and comprising a retort mounted for tilting movement and having charging and casting openings located on opposite sides of its tilting axis, and power means for imparting tilting movement to said retort and located to one side thereof in a plane intermediate of said openings.

49. The combination with a tilting electric metallurgical furnace, of an electrode supporting arm carried on said furnace and having electric cable attaching means, a transformer in line with and below the tilting axis of said furnace, a flexible electrically conducting cable connected at one end to said electrode arm and at its other end to said transformer, the transformer end of said cable approximately coinciding with the center of rotation of the electrode end of said cable.

50. An electrical metallurgical furnace comprising a retort mounted for tilting movement, an electrode, an electrically conducting horizontal arm for supporting said electrode, and a cable holder comprising a pair of cable clamping plates secured to said arm, said plates being provided with interior grooves extending upwardly and outwardly and adapted to engage individual cables.

51. The combination with a metallurgical furnace, of a charging platform therefor, a support carried by the furnace, a plurality of electrodes carried by said support, and an electrode hoisting means comprising a motor winch located beneath said platform and to one side of said furnace approximately 90° from the spout thereof.

52. A metallurgical furnace having electrical heating means and comprising a retort, rockers on which said retort is mounted, traction rollers supporting said rockers, means for driving said traction rollers for causing a rockng motion of the furnace and means carried by said rockers to limit the rocking motion thereof on said rollers.

53. The combination with a tilting electric furnace of mechanism for adjusting electrodes in said furnace, said mechanism comprising a motor mounted on a stationary support and transmission means between the motor and the electrodes adapted to hold the latter in substantially the same position with reference to the furnace when the furnace is tilted as when it is upright.

54. The combination with a tilting electric furnace of mechanism for adjusting electrodes in said furnace, said mechanism comprising a motor mounted on a stationary support, and lifting cables from said motor to the electrodes, said cables being of substantially the same effective length in the tilted position of the furnace and in its upright position.

55. The combination with a tilting electric furnace of electrode-adjusting mechanism for said furnace, said mechanism comprising a motor mounted independently of the furnace and transmission means between the motor and electrodes, said motor and transmission means being arranged to hold the electrodes in substantially the same position with reference to the furnace when the furnace is tilted as when it is upright.

56. The combination with a tilting electric furnace of electrode-adjusting mechanism for said furnace, said mechanism comprising a motor mounted independently of the furnace and transmission means between the motor and electrodes, said motor and transmission means being arranged to hold the electrodes in substantially the same position with reference to the furnace throughout the tilting movement of the furnace.

57. The combination with a tilting electric furnace of mechanism for adjusting electrodes in said furnace, said mechanism comprising a motor mounted on a stationary support and transmission means between the motor and the electrodes adapted to hold the latter in substantially the same position with reference to the furnace throughout the tilting movement of the furnace.

58. The combination with a tilting electric furnace of electrode adjusting mechanism for said furnace, said mechanism comprising a motor mounted independently of the furnace and a flexible connection extending from said motor to the electrode. one part of said connection extending from the motor to a member mounted on the furnace and engaging said member at a point which is substantially unchanged when the furnace is tilted and another part of said connection extending from said point of engagement to the electrode, whereby the latter is held in substantially the same position with reference to the furnace when the furnace is tilted as when it is upright.

59. The combination with a tilting electric furnace of electrode adjusting mechanism for said furnace, said mechanism comprising a motor mounted independently of the furnace, a pulley mounted on the furnace and a cable operated by said motor and extending over said pulley to its electrode, said pulley being located in such a position on the furnace that as the latter is tilted the electrode is held in substantially the same position with reference to the furnace as when it is upright.

In testimony whereof I affix my signature.

WM. E. MOORE.